US012728910B2

United States Patent

(12) United States Patent
Schoon et al.

(10) Patent No.: US 12,728,910 B2
(45) Date of Patent: Sep. 8, 2026

(54) ELECTRIC POWER STEERING SYSTEM WITH A BALL-SCREW ASSEMBLY

(71) Applicant: ZF Friedrichshafen AG, Friedrichshafen (DE)

(72) Inventors: Benjamin Warren Schoon, Lafayette, IN (US); Caleb Seth Crum, Rossville, IN (US)

(73) Assignee: ZF Friedrichshafen AG, Friedrichshafen (DE)

( * ) Notice: Subject to any disclaimer, the term of this patent is extended or adjusted under 35 U.S.C. 154(b) by 855 days.

(21) Appl. No.: 17/962,716

(22) Filed: Oct. 10, 2022

(65) Prior Publication Data

US 2024/0116561 A1 Apr. 11, 2024

(51) Int. Cl.

| | |
|---|---|
| ***B62D 5/04*** | (2006.01) |
| ***F16H 37/12*** | (2006.01) |
| ***F16H 57/038*** | (2012.01) |
| ***F16H 57/08*** | (2006.01) |
| *F16H 55/17* | (2006.01) |
| *F16H 57/02* | (2012.01) |

(52) U.S. Cl.

CPC ......... *B62D 5/0448* (2013.01); *B62D 5/0424* (2013.01); *F16H 37/124* (2013.01); *F16H 57/038* (2013.01); *F16H 57/08* (2013.01); *F16H 2055/176* (2013.01); *F16H 2057/02034* (2013.01); *F16H 2057/02082* (2013.01)

(58) Field of Classification Search

CPC ...... B62D 5/0448; B62D 5/0424; B62D 1/20; B62D 5/0421; F16H 37/124; F16H 57/038; F16H 57/08; F16H 2057/02034

See application file for complete search history.

(56) References Cited

U.S. PATENT DOCUMENTS

| | | | | |
|---|---|---|---|---|
| 5,890,394 A * | 4/1999 | Anderson | ................ | B62D 3/12 180/428 |
| 10,196,084 B2 | 2/2019 | Kim | | |
| 10,876,596 B1 * | 12/2020 | Bonny | .................. | F16D 65/186 |
| 2005/0016790 A1 * | 1/2005 | Murakami | ........... | B62D 5/0448 180/444 |

(Continued)

FOREIGN PATENT DOCUMENTS

| | | |
|---|---|---|
| CN | 110733563 A | 1/2020 |
| CN | 215590828 U | 1/2022 |

(Continued)

OTHER PUBLICATIONS

Kim Ho Sik, Steer-By-Wire Type Steering Apparatus, Feb. 5, 2020, EPO, KR 20-2020-012518 A, Machine Translation of Description (Year: 2020).*

*Primary Examiner* — James A English

(74) *Attorney, Agent, or Firm* — Dority & Manning, P.A.

(57) ABSTRACT

An electric power steering assembly includes an electric motor, a gearset, and a ball-screw assembly. The gearset couples the electric motor and a ball nut of the ball-screw assembly such that the electric motor is operable to rotate the ball nut relative to the ball shaft. A plurality of bearings are circulatable through a helical track, which is defined between the ball nut and a ball shaft of the ball-screw assembly, when the ball nut rotates relative to the ball shaft in order to translate the ball shaft relative to the ball nut.

19 Claims, 6 Drawing Sheets

(56) References Cited

U.S. PATENT DOCUMENTS

| | | | | |
|---|---|---|---|---|
| 2009/0071744 | A1 * | 3/2009 | Kim | B62D 5/008 180/444 |
| 2009/0260468 | A1 * | 10/2009 | Tachikake | B62D 5/0448 74/424.82 |
| 2015/0110551 | A1 | 4/2015 | Aoki et al. | |
| 2015/0274192 | A1 | 10/2015 | Enomoto | |
| 2017/0113718 | A1 | 4/2017 | Ohashi et al. | |
| 2017/0113719 | A1 | 4/2017 | Ohashi et al. | |
| 2017/0267277 | A1 | 9/2017 | Ohashi | |
| 2017/0297608 | A1 | 10/2017 | Span et al. | |
| 2018/0162439 | A1 | 6/2018 | Asakura et al. | |
| 2018/0334187 | A1 | 11/2018 | Kato | |
| 2019/0263443 | A1 | 8/2019 | Illes et al. | |
| 2019/0351932 | A1 | 11/2019 | Washnock et al. | |
| 2020/0070870 | A1 | 3/2020 | Terada | |
| 2020/0094869 | A1 | 3/2020 | Jeon | |
| 2020/0317262 | A1 | 10/2020 | Sovern | |
| 2020/0398887 | A1 * | 12/2020 | Boyle | B62D 5/0448 |
| 2021/0061347 | A1 * | 3/2021 | Boyle | F16H 25/2204 |
| 2021/0291891 | A1 | 9/2021 | Hauser et al. | |
| 2022/0001918 | A1 | 1/2022 | Hoersch et al. | |
| 2022/0204072 | A1 * | 6/2022 | Boyle | B62D 5/0421 |

FOREIGN PATENT DOCUMENTS

| | | | | | |
|---|---|---|---|---|---|
| CN | 215622243 | U | | 1/2022 | |
| DE | 102006041720 | A1 | | 4/2008 | |
| DE | 102007012655 | A1 | | 7/2008 | |
| DE | 102009008591 | A1 | | 8/2010 | |
| DE | 102017220251 | A1 | | 5/2019 | |
| DE | 1020200125331 | A1 | | 3/2022 | |
| EP | 1621444 | A1 | * | 2/2006 | B62D 5/0409 |
| JP | 2016097840 | A | | 5/2016 | |
| JP | 2018096410 | A | | 6/2018 | |
| KR | 20120082114 | A | | 7/2012 | |
| KR | 20200012518 | A | * | 2/2020 | |
| WO | WO 2022/042793 | A1 | | 3/2022 | |

* cited by examiner

ELECTRIC POWER STEERING SYSTEM WITH A BALL-SCREW ASSEMBLY

FIELD OF THE INVENTION

The present subject matter relates generally to power steering systems for commercial vehicles.

BACKGROUND OF THE INVENTION

Conventional commercial vehicles generally include hydraulic power steering. Known hydraulic power steering systems include a hydraulic piston actuated by pressurized hydraulic fluid from a pump. A steering wheel and the hydraulic piston are both coupled to a steering linkage, and the pressurized hydraulic fluid from the pump selectively extends and retracts the hydraulic piston to supplement torque applied to the steering linkage by a driver turning the steering wheel.

While known hydraulic power steering systems function well in conventional commercial vehicles, utilizing hydraulic power steering in electric and/or hybrid commercial vehicles poses challenges. An electric power steering system for commercial vehicles would be useful.

BRIEF DESCRIPTION OF THE INVENTION

Aspects and advantages of the invention will be set forth in part in the following description, or may be apparent from the description, or may be learned through practice of the invention.

The present subject matter relates generally to an electric power steering system for commercial vehicles. The electric power steering system includes a ball-screw assembly with a ball nut and a ball shaft that collectively define a helical track. An electric motor is coupled to the ball nut and operable to rotate the ball nut relative to the ball shaft. A plurality of bearings are circulatable through the helical track when the ball nut rotates relative to the ball shaft in order to translate the ball shaft relative to the ball nut. A gearset couples the electric motor and the ball nut such that the electric motor is operable to rotate the ball nut relative to the ball shaft. The gearset includes a plurality of gearwheels. A bevel gearbox is connectable to a steering wheel column and one of the gearwheels of the gearset. The gearset and the bevel gearbox thus provide an input for both the electric motor and a manual steering wheel. Thus, the present subject matter may electrify the power steering of heavy commercial vehicles, in a safe, robust, axially compact, and/or cost-effective manner.

In an example embodiment, an electric power steering assembly includes a ball-screw assembly with a ball nut and a ball shaft that collectively define a helical track. The ball nut is rotatable relative to the ball shaft. A plurality of bearings are circulatable through the helical track when the ball nut rotates relative to the ball shaft in order to translate the ball shaft relative to the ball nut. The electric power steering assembly also includes an electric motor and a gearset coupling the electric motor and the ball nut such that the electric motor is operable to rotate the ball nut relative to the ball shaft. The gearset includes a first gearwheel, a second gearwheel, and a third gearwheel. The first gearwheel is coupled to a rotor of the electric motor. The third gearwheel is meshed with a gear toothing of the ball nut. The second gearwheel is disposed between the first and third gearwheels in a power flow path between the first and third gearwheels. The electric power steering assembly further includes a bevel gearbox. An input of the bevel gearbox is connectable to a steering wheel column, and an output of the bevel gearbox connected to the second gearwheel of the gearset.

In a first example aspect, the bevel gearbox may include a first bevel gear and a second bevel gear. The first bevel gear may be meshed with the second bevel gear. The first bevel gear may be connectable to the steering wheel column at the input of the bevel gearbox, and the second bevel gear may be connected to the second gearwheel of the gearset at the output of the bevel gearbox.

In a second example aspect, the second gearwheel may be meshed with the first and third gearwheels.

In a third example aspect, the electric power steering assembly may further include a planetary gear set. A sun gear of the planetary gear set may be connected to the rotor of the electric motor, and a carrier of the planetary gear set may be connected to the first gearwheel of the gear set.

In a fourth example aspect, a ring gear of the planetary gear set may be fixed relative to a housing of the electric motor.

In a fifth example aspect, a gear ratio of the planetary gear set may be no less than 7.5:1 and no greater than 8.5:1, and a gear ratio of the gearset may be no less than 1:1 and no greater than 2:1.

In a sixth example aspect, a root diameter of the second gearwheel may be greater than a root diameter of the third gearwheel, and the root diameter of the third gearwheel may be greater than the root diameter of the first gearwheel.

In a seventh example aspect, a length of the ball shaft may be no less than three hundred millimeters and no greater than nine hundred millimeters.

In an eighth example aspect, the ball-screw assembly, the electric motor, and the bevel gearbox may be positioned on the same axial side of the gearset.

In a ninth example aspect, the electric power steering assembly may further include a pair of ball joints and a pair of concertinaed jackets. Each of the pair of ball joints may be mounted to the ball shaft at a respective end portion of the ball shaft. Each of the pair of concertinaed jackets may be mounted over a respective one of the pair of ball joints. The ball shaft defines an axial passage, and air is flowable between the pair of concertinaed jackets through axial passage.

In a tenth example aspect, the axial passage and interiors of the pair of concertinaed jackets may collectively define a sealed air chamber relative to ambient air around the electric power steering assembly.

In an eleventh example aspect, the ball-screw assembly may further include a housing. The ball nut may be rotatably mounted within the housing. The ball shaft may be translatable relative to the housing. An outer surface of the ball shaft may include at least one spline received by the housing in order to limit rotation of the ball shaft relative to the housing.

In a twelfth example aspect, a gear ratio of the gearset may be no less than 1:1 and no greater than 2:1, and a gear ratio of the bevel gearbox may be no less than 0.25:1 and no greater than 0.75:1.

In a thirteenth example aspect, a vehicle may include the electric power steering assembly.

In a fourteenth example aspect, the vehicle may be a Class 8 commercial vehicle based on the gross vehicle weight rating.

Each of the example aspects recited above may be combined with one or more of the other example aspects recited above in certain embodiments. For instance, all of the fourteen example aspects recited above may be combined with one another in some embodiments. As another example, any combination of two, three, four, five, six, or more of the fourteen example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
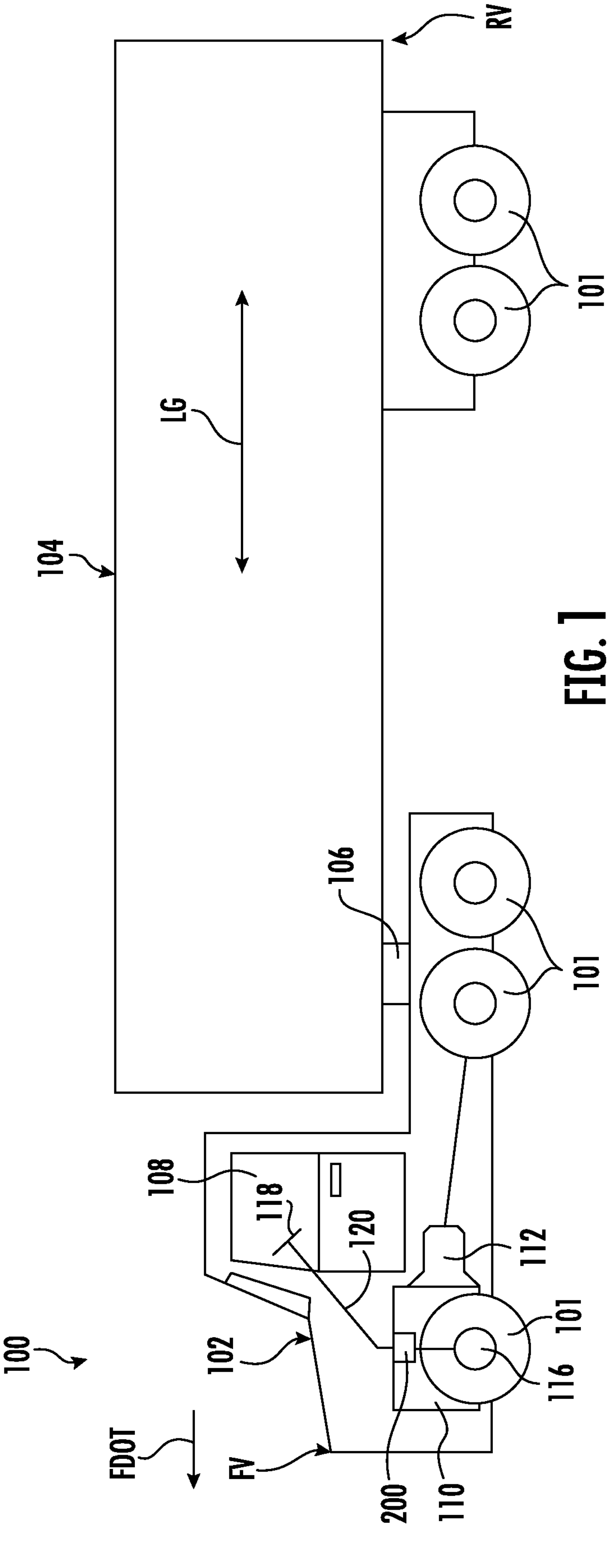
FIG. 1 is a side, elevation view of a vehicle according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “includes” and “including” are intended to be inclusive in a manner similar to the term “comprising.” Similarly, the term “or” is generally intended to be inclusive (i.e., “A or B” is intended to mean “A or B or both”). Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. For example, the approximating language may refer to being within a ten percent (10%) margin.

Example embodiments of the present disclosure are directed to an electric power steering system for heavy commercial vehicles. The electric power steering system may include a ball-screw assembly. Utilizing the ball-screw assembly may advantageously provide a mechanical advantage between an electric motor and/or a vehicle handwheel and steering knuckles of the commercial vehicle. Moreover, the electric power steering system may provide a mechanically robust, safe, and cost-effective power steering system for heavy commercial vehicles.

FIG. 1 illustrates a side, elevation view of vehicle 100. As shown in FIG. 1, Vehicle 100 includes a tractor 102 and a trailer 104 and is generally referred to as a “tractor-trailer truck.” As an example, vehicle 100 may be a Class 8 commercial vehicle based on a gross vehicle weight rating. Vehicle 100 is provided as an example only. For instance, vehicle 100 may include one, two, or more additional trailers in alternative example embodiments. In addition, while described below in the context of vehicle 100, it will be understood that the present subject matter may be used in or with any other suitable vehicle, including passenger vehicles, such as cars, vans, trucks, etc., or commercial vehicles, such as buses, box trucks, farm vehicles, construction vehicles, etc., in other example embodiments.

Vehicle 100 may define a longitudinal direction LG. A front portion FV of vehicle 100 and a rear portion RV of vehicle 100 may be spaced apart from each other along the longitudinal direction LG. Thus, vehicle 100 may extend between the front and rear portions FV, RV of vehicle 100 along the longitudinal direction LG. Front portion FV of vehicle 100 may be positioned forward of rear portion RV of vehicle 100 along a forward direction of travel FDOT. Tractor 102 may be positioned at the front portion FV of vehicle 100

Tractor 102 may be pivotally connected to trailer 104 via a hitch 106 and operative to tow trailer 104. Various items for transport may be stored within trailer 104. In alternative example embodiments, trailer 104 may be open, e.g., a flat bed, depending on items stored on trailer 104. Tractor 102 may include various components for towing trailer 104, including a motor system 110, a transmission system 112, a steering system 200, a braking system 116, etc. A driver may sit within a cab 108 of tractor 102 during operation.

In general, motor system 110, transmission system 112, and braking system 116 may be configured in any conventional manner. For example, motor system 110 may generally include a suitable prime mover, such as an electric motor and/or internal combustion engine, that is operative to propel vehicle 100. Motor system 110 may be disposed within tractor 102 and may be connected to transmission system 112. Transmission system 112 is disposed within power flow between motor system 110 and wheels 101 of vehicle 100. Transmission system 112 is operative to provide various speed and torque ratios between an input and output of the transmission system 112. Thus, e.g., transmission system 112 may provide a mechanical advantage to assist propulsion of vehicle 100 by motor system 110. Braking system 116 is operable to decelerate vehicle 100.

For instance, braking system 116 may include friction brakes configured to selectively reduce the rotational velocity of wheels 101. Braking system 116 may also be configured to as a regenerative braking system that converts kinetic energy of wheels 101 into electric current. Operation of motor system 110, transmission system 112, and braking system 116 is well known to those skilled in the art and not described in extensive detail herein for the sake of brevity.

Figure 2:
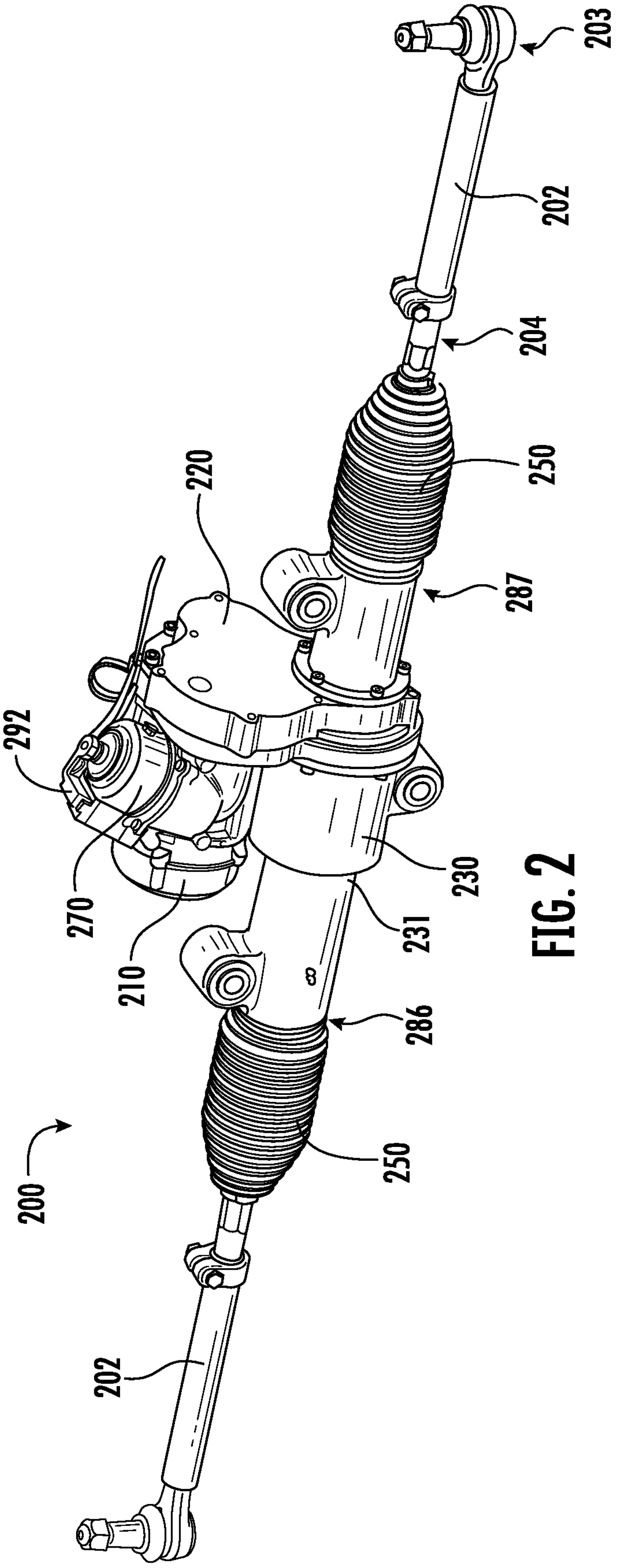
FIG. 2 is a perspective view of an electric power steering system according to an example embodiment of the present subject matter.

Steering system 200 is operable to adjust the direction of travel of vehicle 100. For instance, steering system 200 may be coupled to the front wheels 101 of vehicle 100 and be operatable to turn the front wheels 101 in response to a driver of commercial vehicle turning a steering device 118 (e.g., a steering wheel) within cab 108 and/or operation of a prime mover (e.g., electric motor 210) within steering system 200. Thus, in general, steering wheel 118 may be connected to steering system 200 by a steering column 120 that extends between and couples steering wheel 118 and steering system 200 such that rotation of steering wheel 118 causes rotation of steering column 120 and translation of a shaft (e.g., ball shaft 234) of steering system 200, which changes a heading angle of the front wheels 101 relative to a forward direction of travel FDOT. The electric motor 210 may be configured to apply a torque to assist a driver in rotating steering column 120. For instance, the amount of torque applied by electric motor 210 may be varied based on a speed of vehicle 100. The total force or torque acting on the steering column 120 (e.g., by a driver and/or electric motor 210) may be measured using one or more shaft sensors 292 (FIG. 2). The shaft sensor(s) 292 may include a transducer(s) configured to output an electrical signal proportional to the dynamic or rotary torque applied to the steering column 120. Alternatively, or additionally, the shaft sensor(s) 292 may include angular position sensors for detecting the angular position of steering column 120, where the angular position of steering column 120 (e.g., from a neutral position) is indicative of the torque acting on steering column 120.

FIG. 2 is a perspective view of an electric power steering system 200 according to an example embodiment of the present subject matter. Electric power steering system 200 may be mounted within vehicle 100, e.g., on a frame of the vehicle 100. Thus, electric power steering system 200 is described in greater detail below in the context of vehicle 100 of FIG. 1. However, it will be understood that electric power steering system 200 may be used in or with any other suitable vehicle, including passenger vehicles, such as cars, vans, trucks, etc., or commercial vehicles, such as buses, box trucks, farm vehicles, construction vehicles, etc., in other example embodiments. In general, electric power steering system 200 may be configured for use in or with commercial vehicles sized greater than twenty-six thousand pounds (26,000 lbs.), greater than seven and a half tons (7.5 t.), or other heavy trucks.

As discussed in greater detail below, electric power steering system 200 includes components for providing a mechanical advantage for an electric motor, e.g., to allow the electric motor to supplement torque applied to a steering linkage by a driver turning a steering wheel. Electric power steering system 200 may also have numerous advantages over hydraulic power steering systems. For instance, electric power steering system 200 may allow for implantation of automatic driver assist features, such as lane keeping, lane departure corrections, and autonomous driving. In addition, electric power steering system 200 may only consume power while in use. In contrast, hydraulic power steering systems require a pump that runs continuously with the prime mover, internal combustion engine.

Figure 3:
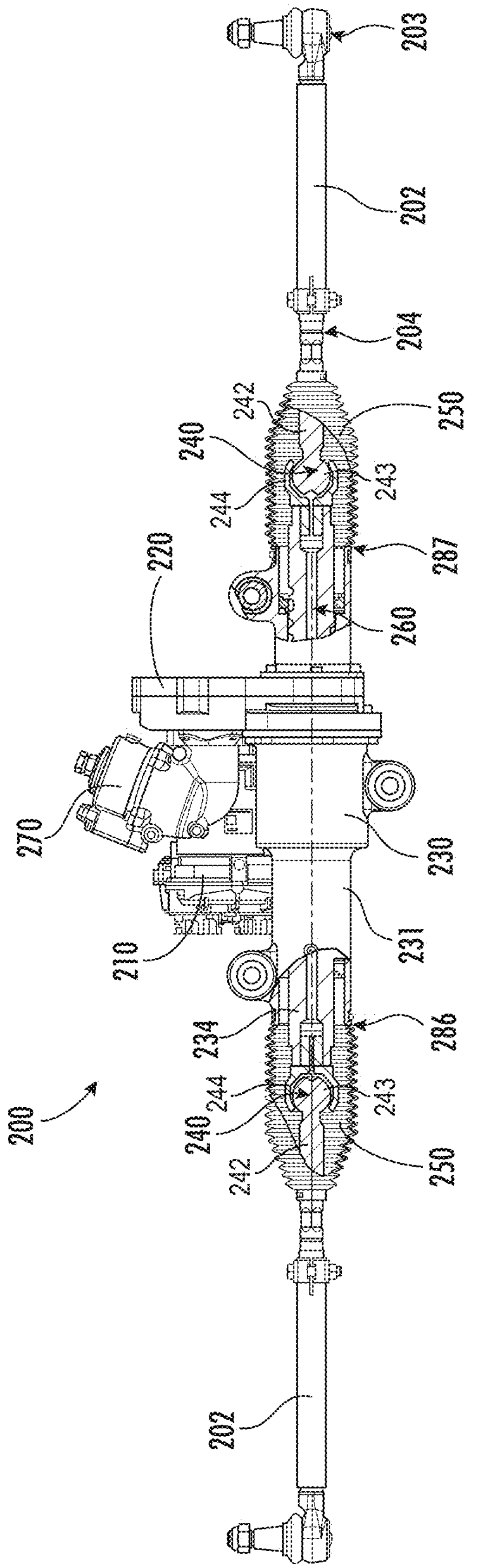
FIG. 3 is a side elevation, partial section view of the example electric power steering system of FIG. 2.

Various views and components of electric power steering system 200 are also shown in FIGS. 2 through 8. Turning now to FIGS. 2 and 3, electric power steering system 200 may include an electric motor 210, a gearset 220, and a ball-screw assembly 230. Electric motor 210 may be coupled to ball-screw assembly 230 via gearset 220. Thus, e.g., rotary motion of electric motor 210 may be transmitted to ball-screw assembly 230 via gearset 220. Moreover, ball-screw assembly 230 may convert the rotary motion of electric motor 210 to translate tie rods 202. Each tie rod 202 may extend between and connect a ball shaft 234 (FIG. 3) of ball-screw assembly 230 to a respective knuckle (not shown) of vehicle 100. In particular, an outer end 203 of each tie rod 202 may be mounted to a steering arm of the respective knuckle, and an inner end 204 of each tie rod 202 may be connected to ball shaft 234. Translation of ball shaft 234 may thus rotate knuckles via tie rods 202 and turn front wheels 101 of vehicle 100.

Electric power steering system 200 may be configured for installation within vehicles with an independent front suspension. Thus, electric power steering system 200 may include a pair of ball joints 240. Ball joints 240 may assist with allowing pivoting of tie rods 202 relative to ball-screw assembly 230, which may be mounted on a frame of vehicle 100. Moreover, when front wheels 101 move relative to the frame and ball-screw assembly 230 on the front suspension, ball joints 240 may permit tie rods 202 to pivot relative to ball-screw assembly 230.

Figure 5:
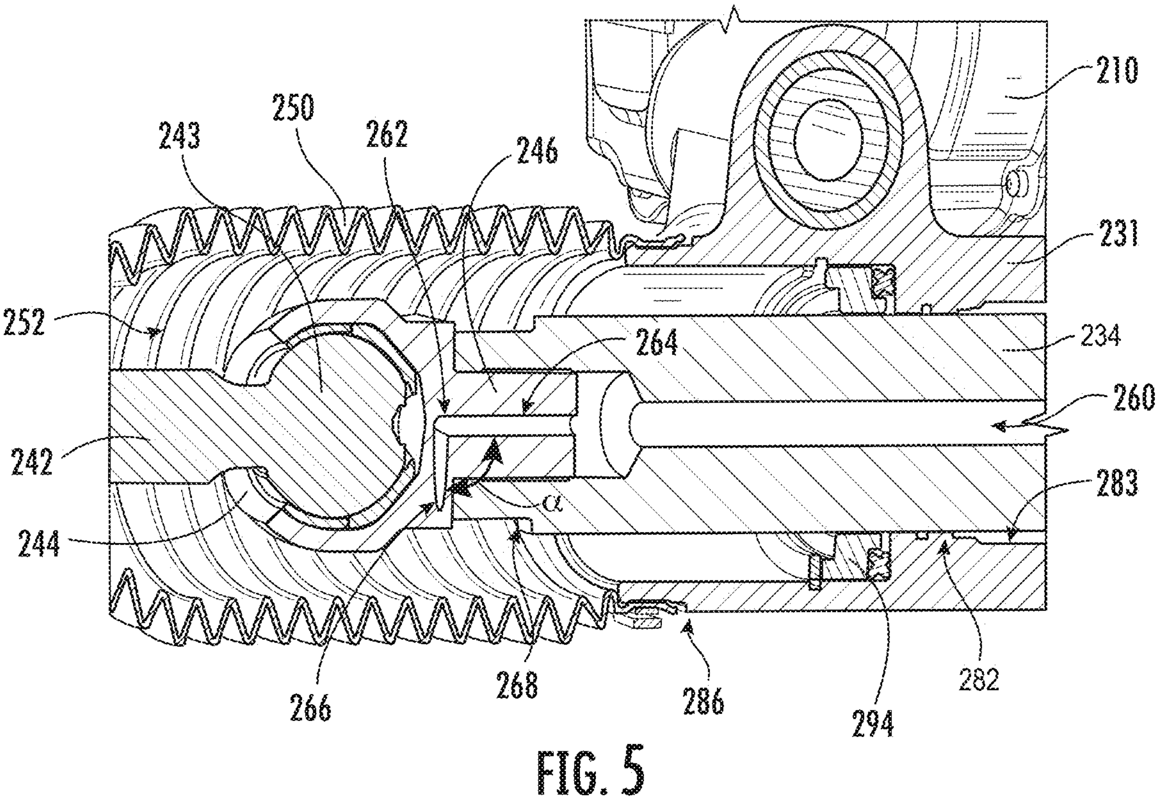
FIG. 5 is a perspective, section view of a ball joint of the example electric power steering system of FIG. 2.

Ball joints 240 may be mounted to ball shaft 234 at opposite end portions of ball shaft 234. Ball joints 240 may be configured to allow free rotation in two planes while limiting translation in any direction. As shown in FIGS. 3 and 5, each ball joint 240 may include a bearing stud 242 and a socket 244. Bearing stud 242 may include a spherical end 243 received within socket 244, and bearing stud 242 may rotate relative to socket 244 in two planes while being prevented from translating away from socket 244. One of bearing stud 242 and socket 244 may be mounted to ball shaft 234, and the other of bearing stud 242 and socket 244 may be mounted to tie rod 202. In the example embodiment shown in FIGS. 3 and 5, socket 244 is mounted (e.g., threaded, welded, adhered, riveted, etc.) to ball shaft 234 and bearing stud 242 is mounted to tie rod 202; however, it will be understood that such mounting arrangement may be reversed in alternative example embodiments.

Turning back to FIGS. 2 and 3, electric power steering system 200 may further include a pair of bellows or concertinaed jackets 250. Each concertinaed jacket 250 may be mounted over a respective one of ball joints 240. Concertinaed jackets 250 may protect ball shaft 234 and ball joints 240 and limit dust and other debris from negatively affecting operation of ball shaft 234 and ball joints 240. One end of concertinaed jackets 250 may be fixed to a housing 231 of ball-screw assembly 230, and the opposite end of concertinaed jackets 250 may be mounted to tie rod 202. The concertinaed jacket 250 may deform (e.g., expand and contract) when tie rod 202 pivots relative to ball shaft 234 and when ball shaft 234 translates to rotate knuckles via tie rods 202 and turn front wheels 101 of vehicle 100.

Figure 4:
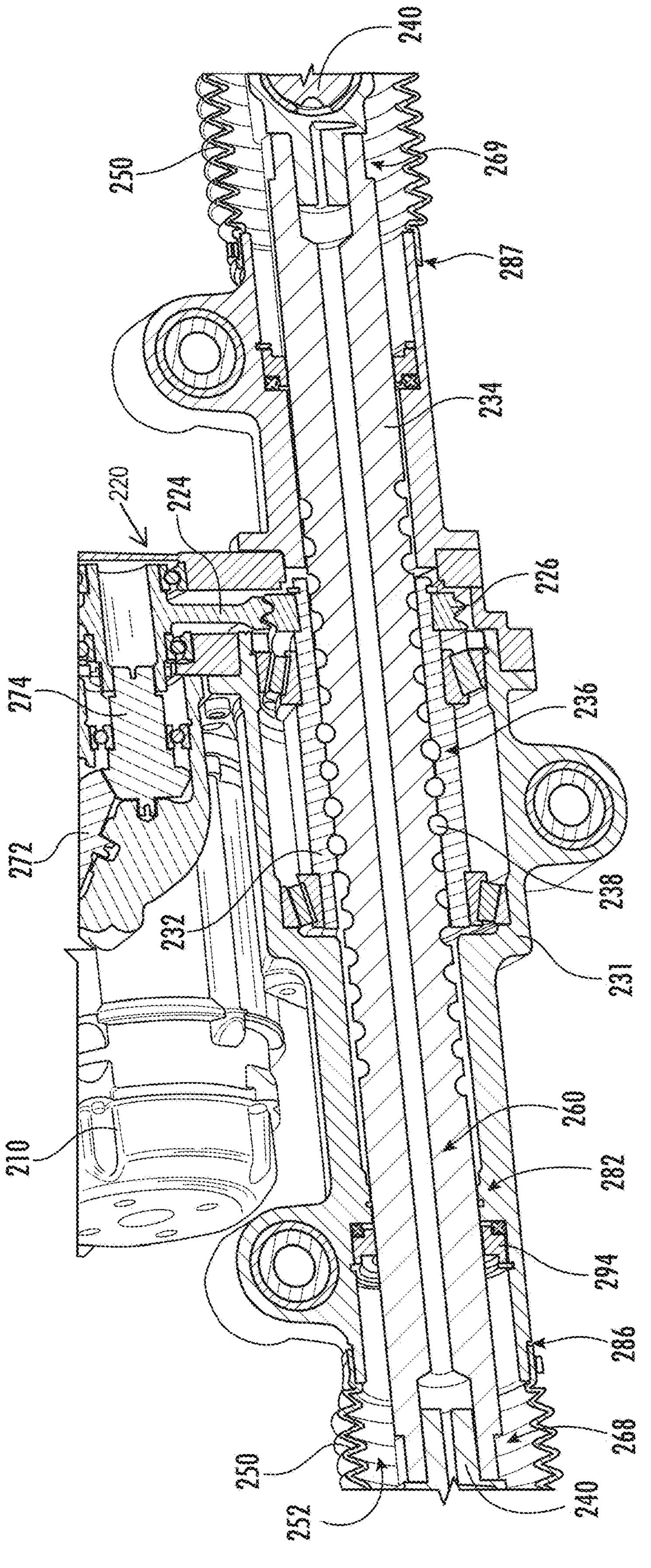
FIG. 4 is a perspective, section view of a ball shaft of the example electric power steering system of FIG. 2.

Turning now to FIG. 4, ball-screw assembly 230 includes a ball nut 232 and a ball shaft 234. Ball shaft 234 may be received within ball nut 232. Ball nut 232 and ball shaft 234 may collectively define a helical track 236. For instance, ball shaft 234 may define a portion of helical track 236 at an outer surface of ball shaft 234, and ball nut 232 may define the other portion of helical track 236 at an inner surface of ball nut 232. The portion of helical track 236 defined by ball shaft 234 may face the portion of helical track 236 defined by ball nut 232 such that helical track 236 is formed radially between ball nut 232 and ball shaft 234.

Ball nut 232 is rotatable relative to ball shaft 234. For instance, ball nut 232 may be rotatably mounted within housing 231, e.g., on tapered roller bearings, and gearset 220 may couple electric motor 210 and ball nut 232 such that electric motor 210 is operable to rotate ball nut 232 relative to ball shaft 234. During rotation of ball nut 232 relative to ball shaft 234, ball shaft 234 may also translate relative to ball nut 232. In particular, a plurality of bearings 238, such as spherical ball bearings, may be disposed within the helical track 236. Bearings 238 are circulatable through the helical track 236, and bearings 238 may drive translation of ball shaft 234 relative to ball nut 232 during rotation of ball nut 232 relative to ball shaft 234. Bearings 238 may recirculate through the helical track 236 within a closed loop.

In certain example embodiments, a length of ball shaft 234 may be no less than three hundred millimeters (300 mm) and no greater than nine hundred millimeters (900 mm), such as about seven hundred and twenty-five millimeters (725 mm). Such sizing of ball shaft 234 may advantageously provide an axially compact ball-screw assembly 230 while also sizing ball shaft 234 for translation in order to rotate knuckles via tie rods 202 and turn front wheels 101 of vehicle 100. Moreover, ball-screw assembly 230 may be more axially compact than known rack-and-pinion assemblies for front steering systems.

During translation of ball shaft 234, the ends of ball shaft 234 may extend and retract relative to housing 231 of ball-screw assembly 230. Moreover, one end of ball shaft 234 may extend away from housing 231, and the opposite end of ball shaft 234 may retract towards housing 231. Such movement of ball shaft 234 may also deform concertinaed jackets 250. For instance, the concertinaed jacket 250 at the end of ball shaft 234 extending away from housing 231 may expand, and the concertinaed jacket 250 at the end of ball shaft 234 retracting towards housing 231 may contract. Such expansion and contraction of concertinaed jackets 250 may change the pressure of air within the concertinaed jackets 250. Thus, electric power steering system 200 may include features for allowing air to move between concertinaed jackets 250 through ball shaft 234.

As shown in FIG. 4, the ball shaft 234 may define an axial passage 260. For example, axial passage 260 may extend between opposite end portions of ball shaft 234. Moreover, ball shaft 234 may extend axially between a first end portion 268 and a second end portion 269, and axial passage 260 may extend through ball shaft 234 between first and second end portions 268, 269 of ball shaft 234. Axial passage 260 may extend and be oriented parallel to a central axis of ball shaft 234 in certain example embodiments.

Air may be flowable between concertinaed jackets 250 through axial passage 260. For instance, air may flow through axial passage 260 from first end portion 268 of ball shaft 234 to second end portion 269 of ball shaft 234 or vice versa. Axial passage 260 may also be sized to facilitate air flow through axial passage 260. For example, a cross-sectional area of axial passage 260, e.g., in a plane perpendicular to the central axis of the ball shaft 234, may be no less than seventy millimeters squared (70 $mm^2$) and no greater than one thousand, two hundred millimeters squared (1200 $mm^2$). Such sizing of axial passage 260, may advantageously allow relatively unrestricted air flow through ball shaft 234 while not adversely affecting the strength of ball shaft 234.

The axial passage 260 and interiors 252 of concertinaed jackets 250 may collectively define a sealed air chamber relative to ambient air around the electric power steering assembly 200. Axial passage 260 may provide a flow path for air between the interiors 252 of concertinaed jackets 250 in order allow air pressure equalization between the interiors 252 of concertinaed jackets 250. As noted above, expansion and contraction of concertinaed jackets 250 may change the pressure of air within the concertinaed jackets 250. Thus, axial passage 260 may advantageously assist with proper operation of concertinaed jackets 250. Moreover, axial passage 260 may also allow electric power steering system 200 to not include vent(s) that allow air within concertinaed jackets 250 to enter and exit concertinaed jackets 250. However, it will be understood that one or more vents may be added to concertinaed jackets 250 in certain example embodiments to assist operation of axial passage 260 with balancing air pressure within concertinaed jackets 250. The vent(s) may include a membrane to permit air flow but limit or prevent transfer of water and other liquids through the vent(s).

Ball joints 240 may also include features for allowing air to move between concertinaed jackets 250 through ball shaft 234. For example, one of the bearing stud 242 and the socket 244 of ball joints 240 may define a connecting passage 262. Air may be flowable between concertinaed jackets 250 through connecting passages 262. For example, connecting passages 262 of ball joints 240 may extend between and connect the axial passage 260 of ball shaft 234 and interiors 252 of concertinaed jackets 250. Thus, air from the interior 252 of concertinaed jacket 250 may enter axial passage 260 of ball shaft 234 through connecting passage 262, and air from axial passage 260 of ball shaft 234 may enter the interior 252 of concertinaed jacket 250 through connecting passage 262. It will be understood that ball joints 240 need not include connecting passage 262 in certain example embodiments. Thus, radial bore holes or other connecting passages may be formed to provide a flow path for air between axial passage 260 and interiors 252 of concertinaed jackets 250 in certain example embodiments, e.g., in addition or alternative to connecting passage 262.

As shown in FIG. 5, connecting passage 262 may include a first portion 264 and a second portion 266. First portion 264 of connecting passage 262 may extending into a stud 246 of socket 244 from axial passage 260 of ball shaft 234. Stud 246 of socket 244 may be threaded or otherwise mounted to ball shaft 234. Second portion 266 of connecting passage 262 may extend into stud 246 of socket 244 from the interior 252 of concertinaed jacket 250. First portion 264 may be oriented at an angle $\alpha$ with respect to the second portion 266 in ball joint 240. The angle $\alpha$ may be no less than sixty degrees (60°) and no greater than one hundred and twenty degrees (120°), such as about ninety degrees (90°). Such angle $\alpha$ may advantageously assist with facilitating air flow into and out of axial passage 260 via connecting passage 262 while also not interfering with mounting of ball joints 240 on ball shaft 234.

As may be seen from the above, output motion, e.g., linear translation, of ball shaft 234 may change the air volume within concertinaed jackets 250. For example, while the air volume is reducing in one of concertinaed jackets 250, the air volume in the other of concertinaed jackets 250 may be increasing at approximately the same rate. Axial passage 260 may allow air transfer between concertinaed jackets 250 to account for such air volume changes. Without such air transfer or sufficient external venting, concertinaed jackets 250 would undesirably inflate or deflate. The axial passage 260 (e.g., and connecting passages 262) may thus advantageously allow air transfer between concertinaed jackets 250 during operation of electric power steering system 200.

Figure 6:
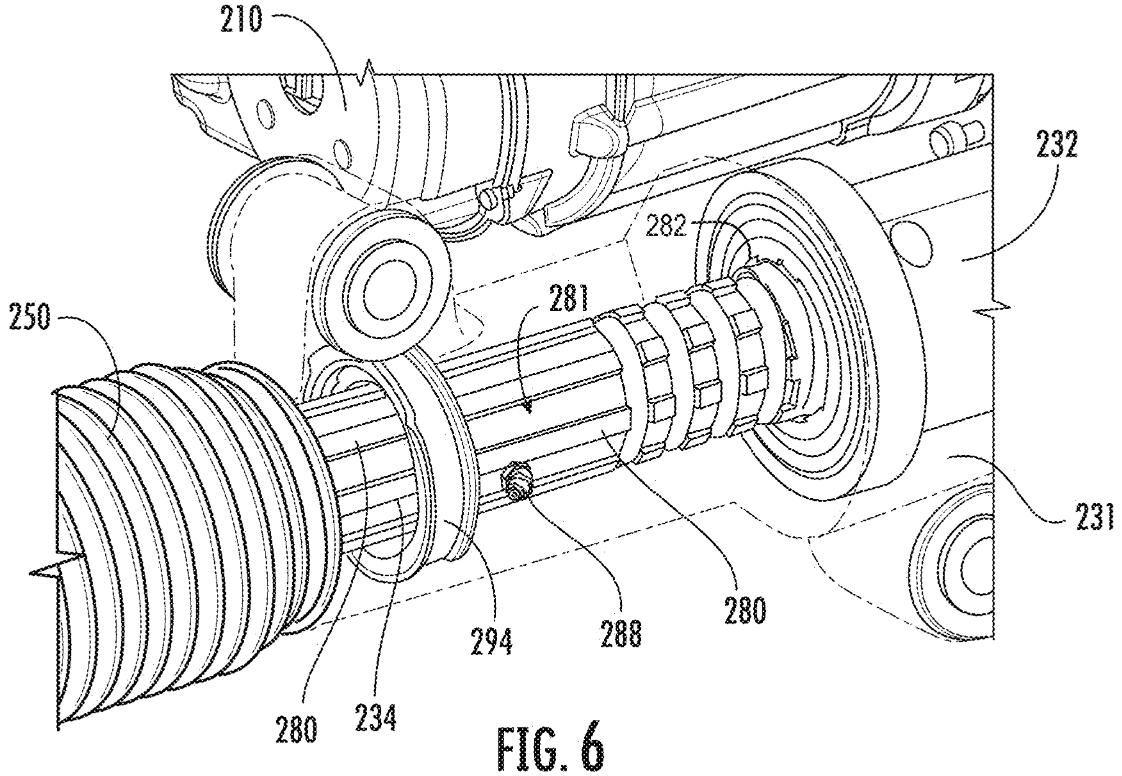
FIG. 6 is a perspective view of the ball shaft engaged with a housing of the example electric power steering system of FIG. 2.

Turning to FIGS. 5 and 6, ball-screw assembly 230 may also include features for limiting or preventing rotation of ball shaft 234 relative to housing 231. For example, as shown in FIG. 6, an outer surface 281 of ball shaft 234 may include at least one spline 280. In certain example embodiments, ball shaft 234 may include one, two, three, four, five, six, or more splines 280. Splines 280 may be distributed circumferentially around ball shaft 234 and may extend axially on ball shaft 234. Housing 231 may define a plurality of slots 282. Slots 282 may be shaped complementary to splines 280, and each spline 280 may be received within a respective one of slots 282. Interference between ball shaft 234 and housing 231 at splines 280 within slots 282 may limit or prevent rotation of ball shaft 234 relative to housing 231 while also allowing translation of ball shaft 234 relative to housing 231. An axial length of slots 282, as shown in FIG. 5, may be no less than six millimeters (6 mm) and no greater than fifty millimeters (50 mm). An axial length of splines 280 may be no less than a length of travel of ball shaft 234 relative to housing 231.

As may be seen from the above, splines 280 on ball shaft 234 may mate with slots 282 on housing 231. Such interface between ball shaft 234 and housing 231 may advantageously prevent rotation of ball shaft 234 relative to housing 231, e.g., due to torque applied by rotation of ball nut 232 relative to ball shaft 234.

Slots 282 may be positioned at an end of housing 231. For example, as shown in FIGS. 3 and 4, housing 231 may extend between a first end portion 286 and a second end portion 287. Slots 282 may be positioned at a first end portion 286 of housing 231, as shown in FIG. 5. Thus, friction between ball shaft 234 and housing 231 at splines 280 within slots 282 may be limited to a small portion of the length of ball shaft 234 in certain example embodiments. Third gearwheel 226, which couples gearset 220 to ball nut 232, may be positioned at a second end portion 287 of housing 231, as shown in FIG. 4. Thus, e.g., slots 282 and third gearwheel 226 may be axially spaced apart and/or positioned at opposite end portions of housing 231.

A grease fitting 288 may also be mounted to housing 231, e.g., proximate slots 282 at first end portion 286 of housing 231, as shown in FIG. 6. The interface between ball shaft 234 and housing 231 may be lubricated by grease introduced into housing 231 via grease fitting 288. Such lubrication may advantageously allow smooth translation of ball shaft 234 relative to housing 231.

Figure 7A:
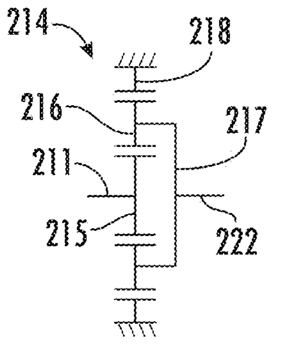
FIG. 7A is a schematic view of a planetary gear set of the example electric power steering system of FIG. 2.
Figure 7:
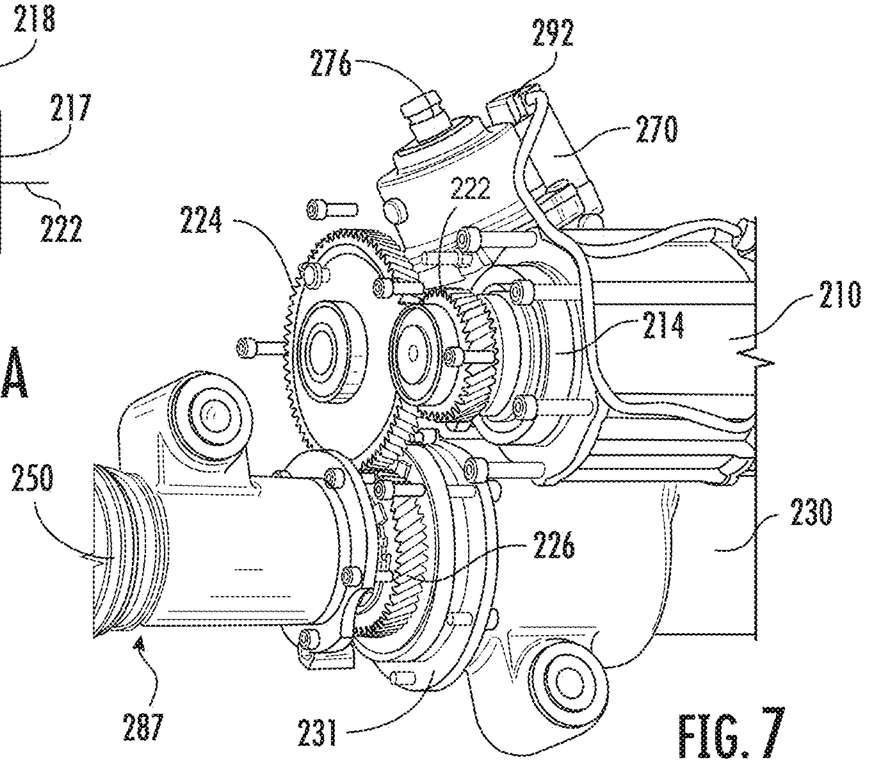
FIG. 7 is a perspective view of a gearset of the example electric power steering system of FIG. 2.
Figure 8:
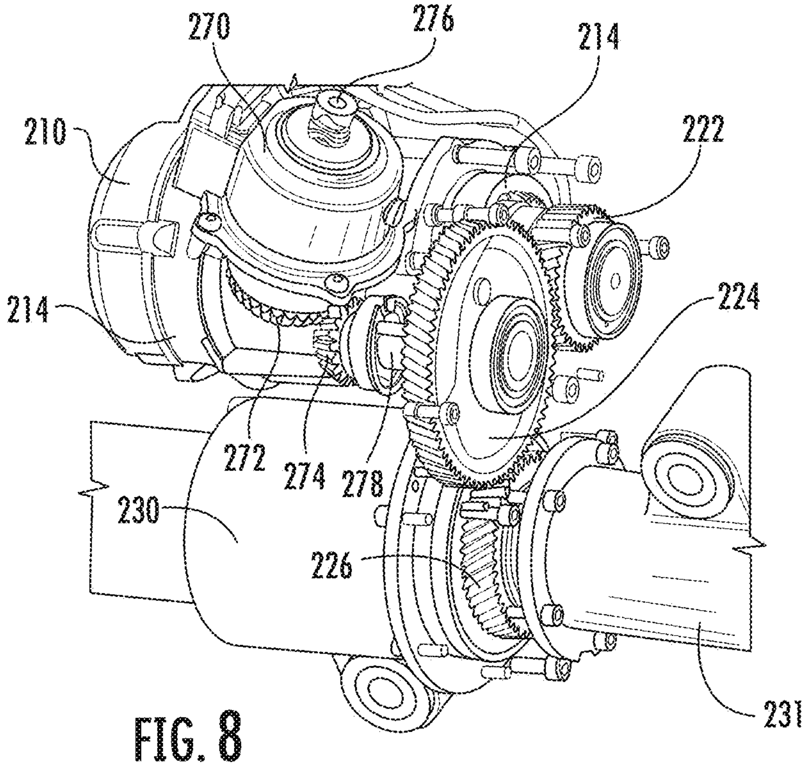
FIG. 8 is another perspective view of the gearset of the example electric power steering system of FIG. 2.

As noted above, gearset 220 may couple electric motor 210 and ball nut 232, and electric motor 210 may be operable to rotate ball nut 232 relative to ball shaft 234 via gearset 220. Turning now to FIGS. 7, 7A, and 8, as shown, the gearset 220 may include a first gearwheel 222, a second gearwheel 224, and a third gearwheel 226. First gearwheel 222, second gearwheel 224, and third gearwheel 226 may collectively form a portion of a power flow path between electric motor 210 and ball nut 232.

First gearwheel 222 may be coupled to a rotor 211 of electric motor 210. For instance, first gearwheel 222 may be coupled to the rotor 211 of electric motor 210 via a planetary gear set 214, as described in greater detail below, and third gearwheel 226 may be coupled to ball nut 232. Third gearwheel 226 may be fixed relative to ball nut 232. In certain example embodiments, third gearwheel 226 may be separately formed and mounted to ball nut 232, e.g., via spline toothing. In other example embodiments, third gearwheel 226 may be integrally formed with ball nut 232, e.g., such that the third gearwheel 226 is formed on ball nut 232. For example, ball nut 232 may be milled, ground, hobbed, shaped, or otherwise suitable machined to form third gearwheel 226. Second gearwheel 224 may be disposed between first and third gearwheels 222, 226 in the power flow path of gearset 220. For example, second gearwheel 224 may be meshed with first and third gearwheels 222, 226.

Planetary gear set 214 may be disposed in power flow between electric motor 210 and gearset 220. Thus, e.g., planetary gear set 214 may be configured for transferring rotation of electric motor 210 to gearset 220. Planetary gear set 214 may include a sun gear 215, a plurality of planet gears 216, a planet carrier 217, and a ring gear 218 (FIG. 7A). Planet gears 216 are meshed with both sun gear 215 and ring gear 218. Thus, e.g., planet gears 216 may be positioned between sun gear 215 and ring gear 218 within planetary gear set 214. It will be understood that, while planetary gear set 214 has one set of planet gears 216 and is thus a negative or minus planetary gear set in the illustrated example embodiment, planetary gear set 214 may include an additional set of planetary gears and thus be a positive or plus planetary gear set in alternative example embodiments.

One of sun gear 215, planet carrier 217, and ring gear 218 of planetary gear set 214 may be connected to and be rotatable with a rotor 211 of electric motor 210 (FIG. 2). Thus, e.g., the one of sun gear 215, planet carrier 217, and ring gear 218 of planetary gear set 214 may correspond to an input of planetary gear set 214 during operation of electric motor 210 when windings within electric motor 210 drive rotation of rotor 211. Moreover, the one of sun gear 215, planet carrier 134, and ring gear 218 of planetary gear set 214 may rotate when windings within electric motor 210 drive rotation of rotor 211. In certain example embodiments, sun gear 215 is connected to and rotatable with rotor 211. For instance, sun gear 215 may be integrally formed with rotor 211, e.g., such that the teeth of sun gear 215 are formed on rotor 211. For example, an end of rotor 211 may be milled, ground, hobbed, shaped, or otherwise suitable machined to form sun gear 215 on rotor 211. Alternatively, sun gear 215 may be separately formed and subsequently connected to rotor 211, e.g., directly onto rotor 211 or with one or more intervening elements, such as a shaft.

Another one of sun gear 215, planet carrier 217, and ring gear 218 of planetary gear set 214 (e.g., other than the one of sun gear 215, planet carrier 217, and ring gear 218 connected to and rotatable with rotor 211) may be connected to and be rotatable with first gearwheel 222 of gearset 220. Thus, e.g., another one of sun gear 215, planet carrier 217, and ring gear 218 of planetary gear set 214 may correspond to an output of planetary gear set 214 during operation of electric motor 210, and first gearwheel 222 may correspond to an input for gearset 220 during operation of electric motor 210. Moreover, the other one of sun gear 215, planet carrier 217, and ring gear 218 of planetary gear set 214 connected to first gearwheel 222 may rotate when windings within electric motor 210 drive rotation of rotor 211. In certain example embodiments, planet carrier 217 is connected to and rotatable with first gearwheel 222. For instance, planet carrier 217 may be connected to first gearwheel 222, e.g., directly or via a suitable shaft or other intermediate components.

Planetary gear set 214 may be configured to provide a reduction between electric motor 210 and gearset 220. For example, a gear ratio of planetary gear set 214 may be no less than 7.5:1 and no greater than 8.5:1, such as about 8:1. Thus, planetary gear set 214 may provide mechanical advantage between electrical motor 210 and gearset 220. Gearset 220 may also be configured to provide a reduction between planetary gear set 214 and ball-screw assembly 230. For example, a gear ratio of gearset 220 may be no less than 1:1 and no greater than 2:1, such as about 1.5:1. Thus, gearset 220 may provide mechanical advantage between planetary gear set 214 and ball-screw assembly 230. To provide such mechanical advantage, a root diameter of second gearwheel 224 may be greater than a root diameter of the third gearwheel 226, and the root diameter of the third gearwheel 226 may be greater than the root diameter of the first gearwheel 222.

Turning now to FIGS. 3, 4, and 8, electric power steering system 200 may include a bevel gearbox 270. An input 276 of bevel gearbox 270 may be connectable to steering column 120 (FIG. 1). An output 278 of bevel gearbox 270 may be connected to second gearwheel 224 of gearset 220. Bevel gearbox 270 may include a first bevel gear 272 and a second bevel gear 274. First bevel gear 272 may be meshed with second bevel gear 274. First bevel gear 272 may be connectable to steering column 120 at the input 276 of bevel gearbox 270, and second bevel gear 274 may be connected to second gearwheel 224 of gearset 220 at the output 278 of bevel gearbox 270. Thus, bevel gearbox 270 may couple steering column 120 to gearset 220. Moreover, bevel gearbox 270 may transfer rotation of steering column 120 to gearset 220 and thus to ball-screw assembly 230 while also changing an angle of such rotation. In certain example embodiments, a gear ratio of bevel gearbox 270 may be no less than 0.25:1 and no greater than 0.75:1, such as about 0.5:1.

As shown in FIGS. 2 and 3, ball-screw assembly 230, electric motor 210, and bevel gearbox 270 may be positioned on the same axial side of gearset 220. Such arrangement of ball-screw assembly 230, electric motor 210, and bevel gearbox 270 may advantageously provide an axially compact electric power steering system 200. Moreover, electric power steering system 200 may be more axially compact than known rack-and-pinion assemblies for front steering systems.

Planetary gear set 214, gearset 220, and ball-screw assembly 230 may cooperate and be configured to provide a mechanical advantage for electric motor 210, e.g., to allow electric motor 210 to supplement driver torque in order to facilitate turning of wheels 101 of vehicle 100, as described in greater detail below.

Bevel gearbox 270 may be coupled to a steering wheel 118 of vehicle 100. For instance, steering wheel 118 may be coupled to second gearwheel 224 via steering column 120 of vehicle 100 that extends between and connects steering wheel 118 to first bevel gear 272 at the input 276 of bevel gearbox 270, and a driver of vehicle 100 may turn steering wheel 118 to rotate first bevel gear 272 via steering column 120 that transfers rotation of steering wheel 118 to first bevel gear 272. Due to the meshing of first and second bevel gears 272, 274, the rotation of steering column 120 is transferred to second bevel gear 274 at the output 278 of bevel gearbox 270. Within electric power steering system 200, the output 278 of bevel gearbox 270 is coupled to second gearwheel 224 of gearset 220 such that the rotation of second bevel gear 274 is transferred to gearset 220.

Electric power steering system 200 includes features for supplementing the torque applied by the driver to steering column 120 by turning wheel 118, e.g., in order to make steering of vehicle 100 easier for the driver. In particular, electric motor 210 is operable to drive rotation of ball nut 232, e.g., to supplement the torque applied by the driver to second gearwheel 224 of gearset 220 by turning wheel 118. As noted above, electric motor 210 may be coupled to ball nut 232 via planetary gear set 214 and gearset 220, e.g., such that rotation of electric motor 210 may drive rotation of ball nut 232 via planetary gear set 214 and gearset 220. For instance, electric motor 210 may operate to rotate rotor 211, and a first one of the components of planetary gear set 214 (e.g., sun gear 215) may rotate during operation of electric motor 210. The rotation of the first one of the components of planetary gear set 214 (e.g., sun gear 215) may drive rotation of a second one of the components of planetary gear set 214 (e.g., planet carrier 217). Due to the coupling of the second one of the components of planetary gear set 214 (e.g., planet carrier 217) to first gearwheel 222 of gearset 220, planetary gear set 214 may transfer rotation of electric motor 210 to gearset 220 such that first gearwheel 222 rotates during operation of electric motor 210. In turn, second gearwheel 224 may transfer the rotation of first gearwheel 222 to third gearwheel 226 within gearset 220, and ball nut 232 may rotate due to the connection of third gearwheel 226 to ball nut 232. Accordingly, ball nut 232 may rotate during operation of electric motor 210, e.g., with a mechanical advantage for electric motor 210 provided by planetary gear set 214 and gearset 220.

During rotation of ball nut 232 relative to ball shaft 234, ball shaft 234 may also translate relative to ball nut 232. Thus, ball-screw assembly 230 may convert the rotary motion of electric motor 210 to translate tie rods 202 coupled to the ball shaft 234. Moreover, translation of ball shaft 234 may rotate knuckles via tie rods 202 and turn front wheels 101 of vehicle 100. Thus, when a driver rotates steering wheel 118 and/or when electric motor 210 operates to rotate ball nut 232, ball-screw assembly 230 may translate ball shaft 234 in order to rotate knuckles via tie rods 202 and turn front wheels 101 of vehicle 100.

To control operation of electrical motor 210, electric power steering system 200 may include a controller 290 and/or a power steering sensor 292. Controller 290 may include a memory and microprocessor, such as a general or special purpose microprocessor operable to execute programming instructions or micro-control code associated with operation of electric power steering system 200. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 290 may be constructed without using a microprocessor, e.g., using a combination of discrete analog and/or digital logic circuitry (such as switches, amplifiers, integrators, comparators, flip-flops. AND gates, and the like) to perform control functionality instead of relying upon software. Electric motor 210 and power steering sensor 292 may be in communication with controller 290 via one or more signal lines or shared communication busses. Controller 290 may also communication with other systems within vehicle 100 via a controller area network (CAN) bus.

Power steering sensor 292 may be configured for detecting a steering torque and/or angle of steering column 120. In response to inputs from power steering sensor 292, controller 290 may operate electric motor 210 to drive rotation of ball nut 232. Moreover, power steering sensor 292 may detect a driver of vehicle 100 turning steering wheel 118, and controller 290 may activate electric motor 210 to supplement driver torque applied at second gearwheel 224 in order to facilitate turning of wheels 101 of vehicle 100. Further, power steering sensor 292 may detect the direction and the degree to which the driver turns steering wheel 118, and controller 290 may operate electric motor 210 to drive rotor 211 a certain number of rotations in a certain direction, both of which complement detected direction and degree from power steering sensor 292.

As may be seen from the above, electric power steering system 200 includes components (e.g., planetary gear set 214, gearset 220, and ball-screw assembly 230) for mechanical reduction between electrical motor 210 and/or steering wheel 118 and output shaft 150, e.g., to convert the low torque and high speed of electric motor 210 into useful higher torque and low speed to effectively steer a heavy commercial vehicle.

Electric power steering system 200 may provide a mechanical robust, safe and cost-effective electric power steering system for heavy commercial vehicles. Moreover, electric power steering system 200 may advantageously: (1) electrify the power steering of heavy commercial vehicles; (2) provide the required mechanical advantage for an electric motor to steer heavy commercial vehicles; (3) provide a compact power steering system; (4) provide a robust and safe electric power steering system for heavy commercial vehicles; and/or (5) provide a cost-effective electric steering system for heavy duty commercial vehicles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

LIST OF REFERENCE CHARACTERS

100 Commercial vehicle
101 Wheels
102 Tractor
104 Trailer
106 Cab
110 Motor system
112 Transmission system
116 Braking system
118 Steering device
120 Steering column
200 Steering system
202 Tie rod
203 Outer end
204 Inner end
210 Electric motor
211 Rotor
212 Motor housing
214 Planetary gear set
215 Sun gear
216 Carrier
218 Ring gear
220 Gearset
222 First gearwheel
224 Second gearwheel
226 Third gearwheel
230 Ball-screw assembly
231 Housing
232 Ball nut
234 Ball shaft
236 Helical track
238 Bearings
240 Ball joints
242 Bearing stud
244 Socket
246 Stud
250 Concertinaed jackets
252 Interior
260 Axial passage
262 Connecting passage
264 First portion (connecting passage)
266 Second portion (connecting passage)
268 First end portion (ball shaft)
269 Second end portion (ball shaft)
270 Bevel gearbox
272 First bevel gear
274 Second bevel gear
276 Input
278 Output
280 Splines
281 Outer surface
282 Slots
283 Inner surface
284 Soft stops
286 First end portion (housing)
287 Second end portion (housing)
288 Grease fitting
290 Controller
292 Power steering sensor
LG Longitudinal direction
FV Front portion
RV Rear portion
FDOT Forward direction of travel
$\alpha$ Angle

What is claimed is:

1. An electric power steering assembly, comprising:
a ball-screw assembly comprising
a ball nut and a ball shaft collectively defining a helical track, the ball nut rotatable relative to the ball shaft, and
a plurality of bearings circulatable through the helical track when the ball nut rotates relative to the ball shaft in order to translate the ball shaft relative to the ball nut;
an electric motor;
a gearset coupling the electric motor and the ball nut such that the electric motor is operable to rotate the ball nut relative to the ball shaft, the gearset comprising a first gearwheel, a second gearwheel, and a third gearwheel, the first gearwheel coupled to a rotor of the electric motor, the third gearwheel meshed with a gear toothing of the ball nut, the second gearwheel disposed between the first and third gearwheels in a power flow path between the first and third gearwheels; and
a bevel gearbox, an input of the bevel gearbox connectable to a steering wheel column, an output of the bevel gearbox connected to the second gearwheel of the gearset,
wherein the output of the bevel gearbox is connected to the second gearwheel of the gearset such that rotation of output of the bevel gearbox is transferred to gearset via the second gearwheel.

2. The electric power steering assembly of claim 1, wherein the bevel gearbox comprises a first bevel gear and a second bevel gear, the first bevel gear meshed with the second bevel gear, the first bevel gear connectable to the steering wheel column at the input of the bevel gearbox, the second bevel gear connected to the second gearwheel of the gearset at the output of the bevel gearbox.

3. The electric power steering assembly of claim 1, wherein the second gearwheel is meshed with the first and third gearwheels.

4. The electric power steering assembly of claim 1, further comprising a planetary gear set, a sun gear of the planetary gear set connected to the rotor of the electric motor, a carrier of the planetary gear set connected to the first gearwheel of the gearset.

5. The electric power steering assembly of claim 4, wherein a ring gear of the planetary gear set is fixed relative to a housing of the electric motor.

6. The electric power steering assembly of claim 4, wherein a gear ratio of the planetary gear set is no less than 7.5:1 and no greater than 8.5:1, and a gear ratio of the gearset is no less than 1:1 and no greater than 2:1.

7. The electric power steering assembly of claim 1, wherein a root diameter of the second gearwheel is greater than a root diameter of the third gearwheel, and the root diameter of the third gearwheel is greater than the root diameter of the first gearwheel.

8. The electric power steering assembly of claim 1, wherein a length of the ball shaft is no less than three hundred millimeters and no greater than nine hundred millimeters.

9. The electric power steering assembly of claim 1, wherein the ball-screw assembly, the electric motor, and the bevel gearbox are positioned on the same axial side of the gearset.

10. The electric power steering assembly of claim 1, further comprising:

a pair of ball joints, each of the pair of ball joints mounted to the ball shaft at a respective end portion of the ball shaft; and a pair of concertinaed jackets, each of the pair of concertinaed jackets mounted over a respective one of the pair of ball joints, wherein the ball shaft defines an axial passage therethrough, and air is flowable between the pair of concertinaed jackets through the axial passage.

11. The electric power steering assembly of claim 10, wherein the axial passage and interiors of the pair of concertinaed jackets collectively define a sealed air chamber relative to ambient air around the electric power steering assembly.

12. The electric power steering assembly of claim 1, wherein the ball-screw assembly further comprising a housing, the ball nut rotatably mounted within the housing, the ball shaft translatable relative to the housing, an outer surface of the ball shaft comprising at least one spline received by the housing in order to limit rotation of the ball shaft relative to the housing.

13. The electric power steering assembly of claim 1, wherein a gear ratio of the gearset is no less than 1:1 and no greater than 2:1, and a gear ratio of the bevel gearbox is no less than 0.25:1 and no greater than 0.75:1.

14. A vehicle, comprising the electric power steering assembly of claim 1.

15. The vehicle of claim 14, wherein the vehicle is a heavy commercial vehicle based on a gross vehicle weight rating.

16. The electric power steering assembly of claim 1, wherein the gear toothing of the ball nut is a spline toothing.

17. The electric power steering assembly of claim 1, wherein the third gearwheel is fixed relative to the ball nut.

18. An electric power steering assembly, comprising:

a ball-screw assembly comprising a ball nut and a ball shaft collectively defining a helical track, the ball nut rotatable relative to the ball shaft, and a plurality of bearings circulatable through the helical track when the ball nut rotates relative to the ball shaft in order to translate the ball shaft relative to the ball nut;

an electric motor;

a gearset coupling the electric motor and the ball nut such that the electric motor is operable to rotate the ball nut relative to the ball shaft, the gearset comprising a first gearwheel, a second gearwheel, and a third gearwheel, the first gearwheel coupled to a rotor of the electric motor, the third gearwheel meshed with a gear toothing of the ball nut, the second gearwheel meshed with the first and third gearwheels;

a planetary gear set, one of a sun gear, a carrier, and a ring gear of the planetary gear set connected to the rotor of the electric motor, another one of the sun gear, the carrier, and the ring gear of the planetary gear set connected to the first gearwheel of the gearset; and a bevel gearbox, an input of the bevel gearbox connectable to a steering wheel column, an output of the bevel gearbox connected to the second gearwheel of the gearset, wherein the output of the bevel gearbox is connected to the second gearwheel of the gearset such that rotation of output of the bevel gearbox is transferred to gearset via the second gearwheel.

19. The electric power steering assembly of claim 18, wherein the ball-screw assembly, the electric motor, and the bevel gearbox are positioned on the same axial side of the gearset.

* * * * *